(12) United States Patent
Noda et al.

(10) Patent No.: US 11,305,240 B2
(45) Date of Patent: Apr. 19, 2022

(54) ZEOLITE MEMBRANE COMPLEX AND METHOD OF PRODUCING ZEOLITE MEMBRANE COMPLEX

(71) Applicant: NGK INSULATORS, LTD., Nagoya (JP)

(72) Inventors: Kenichi Noda, Nagoya (JP); Aya Miura, Nagoya (JP); Ryotaro Yoshimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 33 days.

(21) Appl. No.: 16/899,981

(22) Filed: Jun. 12, 2020

(65) Prior Publication Data
US 2020/0306700 A1    Oct. 1, 2020

Related U.S. Application Data

(63) Continuation of application No. PCT/JP2018/044905, filed on Dec. 6, 2018.

(30) Foreign Application Priority Data

Jan. 16, 2018   (JP) .............................. JP2018-004980

(51) Int. Cl.
*B01D 71/02* (2006.01)
*B01D 53/22* (2006.01)
(Continued)

(52) U.S. Cl.
CPC ......... *B01D 71/028* (2013.01); *B01D 53/228* (2013.01); *B01D 67/0051* (2013.01); *B01D 69/10* (2013.01); *C01B 39/54* (2013.01)

(58) Field of Classification Search
None
See application file for complete search history.

(56) References Cited

U.S. PATENT DOCUMENTS

| | | | | |
|---|---|---|---|---|
| 2008/0214686 A1* | 9/2008 | Suzuki | ................. | B01D 71/028 521/27 |
| 2015/0010704 A1* | 1/2015 | Hagio | ................ | B01D 67/0051 427/245 |
| 2017/0291135 A1* | 10/2017 | Noda | ................... | B01D 71/028 |

FOREIGN PATENT DOCUMENTS

| | | | | |
|---|---|---|---|---|
| WO | 2016/121889 A1 | 8/2016 | | |
| WO | WO 2016121889 A1 * | 8/2016 | ........... | B01D 71/028 |

OTHER PUBLICATIONS

English translation of the International Preliminary Report on Patentability (Chapter I) (Application No. PCT/JP2018/044905) dated Jul. 30, 2020.

(Continued)

*Primary Examiner* — Jason M Greene
(74) *Attorney, Agent, or Firm* — Burr & Brown, PLLC

(57) ABSTRACT

A zeolite membrane complex includes a support and a zeolite membrane formed on the support. The zeolite membrane is of an SAT-type zeolite. Among particles on the surface of the zeolite membrane, particles that have aspect ratios higher than or equal to 1.2 and lower than or equal to 10 account for 85% or more of the area of the surface of the zeolite membrane. This improves the orientations of the particles and also reduces the interstices among the particles. As a result, the denseness of the zeolite membrane is improved. Accordingly, for example, high gas separation performance can be obtained when the zeolite membrane complex is used as a gas separation membrane.

7 Claims, 3 Drawing Sheets

(51) Int. Cl.
*B01D 67/00* (2006.01)
*B01D 69/10* (2006.01)
*C01B 39/54* (2006.01)

(56) References Cited

OTHER PUBLICATIONS

Graham W. Noble, et al., "The Templated Synthesis and Structure Determination by Synchrotron Microcrystal Diffraction of the Novel Small Pore Magnesium Aluminophosphate STA-2," *Journal of Chemical Society*, Dalton Transactions, 1997, pp. 4485-4490.
Maria Castro, et al., "Molecular Modeling, Multinuclear NMR, and Diffraction Studies in the Templated Synthesis and Characterization of the Aluminosphosphate Molecular Sieve STA-2," *Journal of Physics and Chemistry C*, 2010, vol. 114, pp. 12698-12710.
International Search Report and Written Opinion (Application No. PCT/JP2018/044905) dated Feb. 12, 2019.

\* cited by examiner

ZEOLITE MEMBRANE COMPLEX AND METHOD OF PRODUCING ZEOLITE MEMBRANE COMPLEX

TECHNICAL FIELD

The present invention relates to a zeolite membrane complex in which a zeolite membrane is formed on a support.

CROSS-REFERENCE TO RELATED APPLICATION

This application claims priority benefit under 35 U.S.C. Section 119 of International Application No. PCT/JP2018/044905 filed in the Japan Patent Office on Dec. 6, 2018, the entire disclosure of which is incorporated herein by reference.

BACKGROUND ART

Various structures of zeolites are known, and three letters of the alphabet are assigned as a code indicating each structure by the International Zeolite Association. One of the structures of zeolites is an SAT-type structure. With respect to SAT-type zeolites, synthesis methods for SAT-type zeolite powder are disclosed in, for example, "The templated synthesis and structure determination by synchrotron microcrystal diffraction of the novel small pore magnesium aluminophosphate STA-2" by Graham W. Noble and other two members, Journal of Chemical Society, Dalton Transactions 1997, pp. 4485-4490 (Document 1) and "Molecular Modeling, Multinuclear NMR, and Diffraction Studies in the Templated Synthesis and Characterization of the Aluminophosphate Molecular Sieve STA-2" by Maria Castro and other 10 members, Journal of Physics and Chemistry C 2010, volume 114, pp. 12698-12710 (Document 2).

Meanwhile, various studies and developments are underway on forming zeolites in membrane form on supports and using the zeolite membranes in applications such as specific gas separation or molecular adsorption. With respect to SAT-type zeolites, in sample No. 4 of an example of International Publication WO 2016/121889 (Document 3), zeolite powder synthesized by the method of Document 1 is applied on the outer surface of a porous alumina substrate, and the substrate is immersed in a synthesis sol used in the synthesis of the zeolite powder so that a zeolite membrane is formed by hydrothermal synthesis.

Incidentally, in the case where an SAT-type zeolite membrane complex is produced by the technique of Document 1, the zeolite membrane is not oriented. Thus, for example, it is difficult to achieve high performance as a gas separation membrane. The same can be said of other applications using zeolite membranes for molecule permeation or adsorption.

SUMMARY OF INVENTION

The present invention is intended for a zeolite membrane complex, and it is an object of the present invention to provide a new SAT-type zeolite membrane complex adequate for various applications.

A zeolite membrane complex according to a preferable embodiment of the present invention includes a support, and a zeolite membrane formed on the support.

The zeolite membrane is of an SAT-type zeolite. Among particles on a surface of the zeolite membrane, particles that have aspect ratios higher than or equal to 1.2 and lower than or equal to 10 account for 85% or more of an area of the surface of the zeolite membrane. According to the present invention, it is possible to provide a new SAT-type zeolite membrane complex.

Preferably, an average value of aspect ratios of the particles on the surface of the zeolite membrane is greater than or equal to 1.4 and less than or equal to 4.

Preferably, the support is porous. More preferably, the support is an alumina sintered compact or a mullite sintered compact.

The present invention is also intended for a method of producing a zeolite membrane complex. The method of producing a zeolite membrane complex according to a preferable embodiment of the present invention includes a) synthesizing an SAT-type zeolite by hydrothermal synthesis and obtaining seed crystals from the SAT-type zeolite, b) depositing the seed crystals on a support, c) immersing the support in a starting material solution having a pH greater than or equal to 5 and less than or equal to 8, and growing an SAT-type zeolite from the seed crystals by hydrothermal synthesis to form a zeolite membrane on the support, the starting material solution being prepared by mixing an aluminum source and a phosphorus source with a PH greater than or equal to 4, and d) removing a structure-directing agent from the zeolite membrane. Among particles on a surface of the zeolite membrane, particles that have aspect ratios higher than or equal to 1.2 and lower than or equal to 10 account for 85% or more of an area of the surface of the zeolite membrane. According to the present invention, it is possible to provide a new SAT-type zeolite membrane complex.

Preferably, an average value of aspect ratios of the particles on the surface of the zeolite membrane is greater than or equal to 1.4 and less than or equal to 4.

Preferably, in the operation a) or c), aluminum alkoxide or an alumina sol is used as the aluminum source in the hydrothermal synthesis.

These and other objects, features, aspects and advantages of the present invention will become more apparent from the following detailed description of the present invention when taken in conjunction with the accompanying drawings.

DESCRIPTION OF EMBODIMENTS

Figure 1:
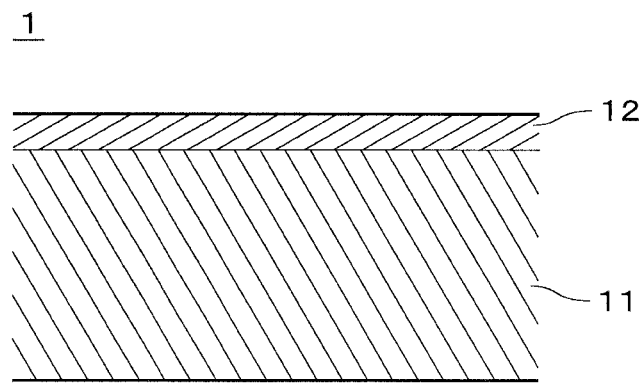
FIG. 1 is a sectional view of a zeolite membrane complex.

FIG. 1 is a sectional view of a zeolite membrane complex 1 according to an embodiment of the present invention. The zeolite membrane complex 1 includes a support 11 and a zeolite membrane 12 formed on the support 11. In FIG. 1, the zeolite membrane 12 is illustrated thicker than the actual one. In the present embodiment, the support 11 is porous and permeable to gases, and the zeolite membrane 12 is a gas separation membrane. The zeolite membrane 12 may be used in other applications as a molecule separation membrane using a molecular sieving function. For example, the zeolite membrane 12 may also be used as a pervaporation membrane. The zeolite membrane complex 1 may also be used in other applications. The support 11 may be impermeable to gases.

Various substances may be employed as the material for the support 11 as long as they have chemical stability in the step of forming the zeolite membrane 12 on the surface. Examples of the material for the support 11 include ceramic sintered compacts, metals, organic polymers, glass, and carbon. Examples of the ceramic sintered compacts include alumina, silica, mullite, zirconia, titania, yttrium, silicon nitride, and silicon carbide. Examples of the metals include aluminum, iron, bronze, and stainless steel. Examples of the organic polymers include polyethylene, polypropylene, polytetrafluoroethylene, polysulfone, and polyimide.

The support 11 may contain an inorganic binder. At least one of titania, mullite, easily sinterable alumina, silica, glass frit, clay minerals, and easily sinterable cordierite can be used as the inorganic binder.

Only part of the support 11 is illustrated in FIG. 1, but for example, the support 11 as a whole has a shape such as a honeycomb shape, a monolithic shape, a flat plate-like shape, a tubular shape, a circular cylindrical shape, a circular columnar shape, or a prism shape. The support 11 has a length of, for example, 10 cm to 200 cm. The support 11 has an outer diameter of, for example, 0.5 cm to 30 cm. In the case where the support 11 has a monolithic shape, the distance between the central axes of adjacent through holes is, for example, in the range of 0.3 mm to 10 mm. In the case where the support 11 has a tubular shape or a flat plate-like shape, the support 11 has a thickness of, for example, 0.1 mm to 10 mm.

The support 11 has surface roughness (Ra) of, for example, 0.1 μm to 5.0 μm, and preferably 0.2 μm to 2.0 μm.

In the case where the zeolite membrane 12 is used as a gas separation membrane, the support 11 is porous. In this case, the mean pore diameter of the support 11 in the vicinity of the surface on which the zeolite membrane 12 is formed is preferably smaller than the mean pore diameters thereof in the other portions. To realize this structure, the support 11 has a multilayer structure. In the case where the support 11 has a multilayer structure, the material for each layer may be any of the materials described above, and the layers may be formed of the same material, or may be formed of different materials. The mean pore diameter can be measured with equipment such as a mercury porosimeter, a perm porometer, or a nano-perm porometer. The mean pore diameter of the support 11 is, for example, in the range of 0.01 μm to 70 μm and preferably in the range of 0.05 μm to 25 μm. The porosity of the support 11 in the vicinity of the surface where the zeolite membrane 12 is formed is preferably in the range of 20% to 60%. This structure is preferably provided within a range of 1 μm to 50 μm from the surface.

As to a pore size distribution of the support 11, D5 is in the range of, for example, 0.1 μm to 50 μm, D50 is in the range of, for example, 0.5 μm to 70 μm, and D95 is in the range of, for example, 10 μm to 2000 μm.

The zeolite membrane 12 has a thickness of, for example, 0.05 μm to 30 μm, preferably 0.1 μm to 10 μm, and more preferably 0.5 μm to 10 μm. As the thickness of the zeolite membrane 12 increases, separation performance improves. As the thickness of the zeolite membrane 12 decreases, permeance increases. The surface roughness (Ra) of the zeolite membrane 12 is, for example, 5 μm or less, preferably 2 μm or less, more preferably 1 μm or less, and yet more preferably 0.5 μm or less.

The zeolite membrane 12 is made of a zeolite having an SAT structure. In other words, the zeolite membrane 12 is made of a zeolite with a framework type code "SAT." The zeolite membrane 12 is, for example, an aluminophosphate (AlPO)-based zeolite composed of at least Al atoms, P atoms, and O atoms. The zeolite membrane 12 has a pore diameter of 0.30×0.55 nm. As described previously, various substances may be adopted as the material for the support 11, but in the case where the zeolite membrane 12 is made of an AlPO-based zeolite, the support 11 is preferably an alumina sintered compact or a mullite sintered compact.

Figure 2:
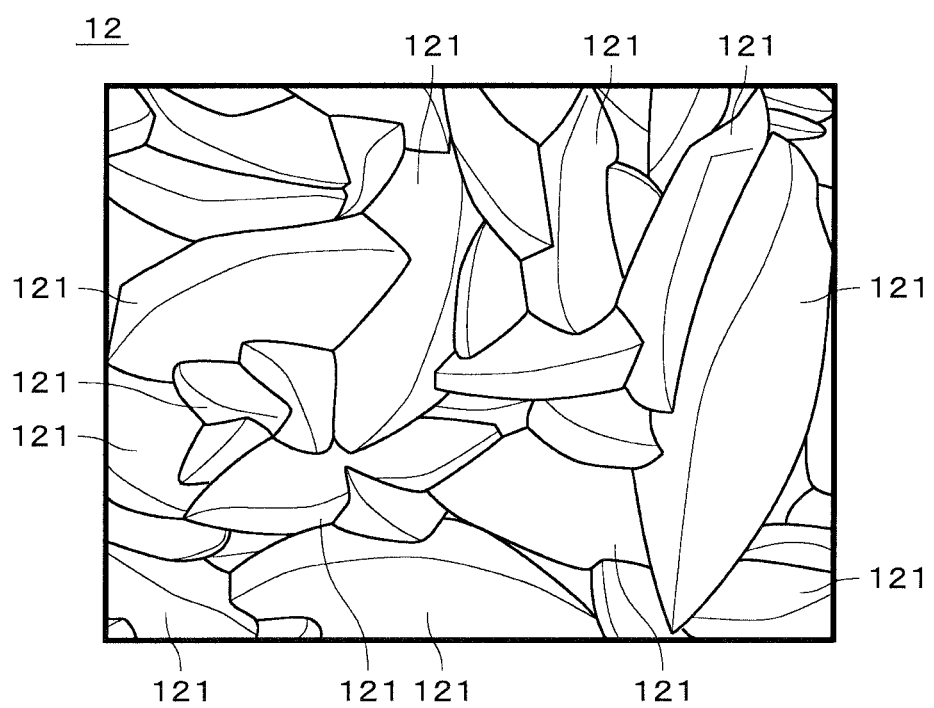
FIG. 2 is an enlarged view of the surface of a zeolite membrane.

FIG. 2 is an enlarged view of the surface of the zeolite membrane 12, observed with a scanning electron microscope (SEM). Part of the surface of the zeolite membrane 12 is illustrated in FIG. 2. Zeolite particles 121 (hereinafter, also simply referred to as "particles 121") are located on the surface of the zeolite membrane 12. Among the particles 121 on the surface of the zeolite membrane 12, particles 121 whose aspect ratios are higher than or equal to 1.2 and lower than or equal to 10 account for 85% or more of the surface area of the zeolite membrane 12. In other words, a total area of regions of particles 121 having aspect ratios higher than or equal to 1.2 and lower than or equal to 10 on the surface of the zeolite membrane 12 is 85% or more of the surface area of the zeolite membrane 12.

Figure 3:
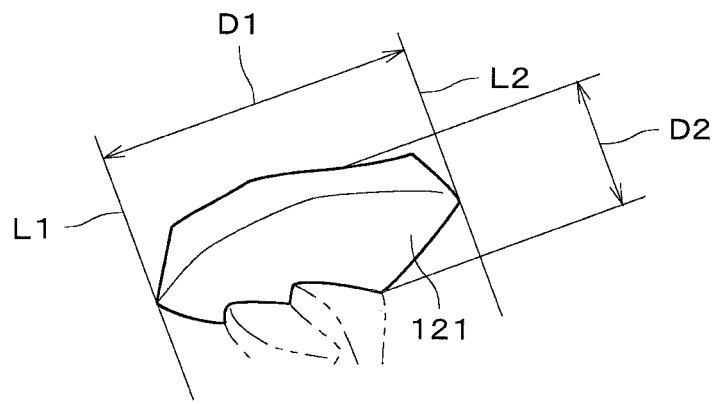
FIG. 3 is an illustration of a method of calculating the aspect ratio of a particle.

A method of calculating the aspect ratio of a particle 121 is illustrated in FIG. 3. In FIG. 3, one particle 121 extracted from the enlarged view (FIG. 2) is illustrated in enlarged dimension. To obtain the aspect ratio of the particle 121, first, a pair of parallel straight lines L1 and L2 is circumscribed around the particle 121 while changing the orientations of the straight lines L1 and L2 in various ways. Then, as illustrated in FIG. 3, an interval between the straight lines L1 and L2 with the orientation in which this interval becomes maximum (i.e., the distance between the straight lines L1 and L2 in the direction perpendicular to the straight lines L1 and L2) is assumed to be a major axis D1. Also, a maximum width of the particle 121 in the direction parallel to the straight lines L1 and L2 is obtained as a minor axis D2. Then, the major axis D1 is divided by the minor axis D2 to obtain the aspect ratio.

The ratio of the regions of particles 121 having aspect ratios higher than or equal to 1.2 and lower than or equal to 10 on the surface of the zeolite membrane 12 can be obtained by the following method. First, 100 or more particles 121 that are randomly selected from the surface of the zeolite membrane 12 are observed with an SEM to obtain the aspect ratio and area of each particle. The total area is obtained by extracting all particles 121 that have aspect ratios higher than or equal to 1.2 and lower than or equal to 10 from among all the observed particles 121. Then, this total area is divided by a total area of all the observed particles 121 so as to obtain the ratio of the total area of the regions of the particles 121 having aspect ratios higher than or equal to 1.2 and lower than or equal to 10 on the surface of the zeolite membrane 12 to the surface area of the zeolite membrane 12.

Since the zeolite membrane 12 contains a relatively large number of particles 121 having aspect ratios higher than or equal to 1.2, the orientation of particles 121 can be improved. Also, since the zeolite membrane 12 contains a relatively large number of particles 121 having aspect ratios lower than or equal to 10, the interstices among particles 121 can be reduced. As a result, it is possible to improve the denseness of the zeolite membrane 12.

In order to verify the orientations of particles 121 on the zeolite membrane 12, X-ray diffraction measurement of the zeolite membrane 12 is performed. In an X-ray diffraction pattern obtained by X-ray irradiation to the zeolite membrane 12, the intensity of a peak existing at around $2\theta=13.9°$ is 1.5 times or more the intensity of a peak existing at around $2\theta=8.50$. In the X-ray diffraction pattern, the intensity of a peak existing at around $2\theta=13.9°$ is more preferably 2 times or more the intensity of a peak existing at around $2\theta=8.5°$. The comparison in intensity between the peak at around $2\theta=13.9°$ and the peak at around $2\theta=8.5°$ is assumed to use the baseline in the X-ray diffraction pattern, i.e., a height excluding background noise components. The X-ray diffraction pattern is obtained by irradiation of CuK α-rays to the surface of the zeolite membrane 12 with use of an X-ray diffractometer (Type MiniFlex600 manufactured by Rigaku Corporation) under conditions including an X-ray output of 600 W (tube voltage of 40 kV, tube current of 15 mA), a scanning speed of 0.5°/min, a scanning step of 0.02°, and a CuK β-ray filter formed of a 0.015 mm-thick Ni foil.

It is known that the intensity of a peak at around $2\theta=13.9°$ indicates the degree of orientation in which the (110) plane, i.e., the aperture plane of a microspore, is oriented toward the surface of the membrane, and it can be seen from the X-ray diffraction pattern having the aforementioned feature that most of the aperture planes of microspores in zeolite crystals are oriented toward the surface of the zeolite membrane 12 (hereinafter, also simply referred to as "membrane surface"). That is, the planes along the apertures and the membrane surface are almost parallel. Accordingly, the zeolite membrane 12 is adequate for utilization in which membranes permeate molecules. The zeolite membrane complex 1 is in particular adequate for gas separation, but can also achieve high performance in various other applications because of the above orientation. With the above orientations of the particles 121, a high binding property is provided between crystals, and accordingly, it is possible to obtain the zeolite membrane 12 with high denseness and high separation performance.

In the zeolite membrane 12, an average value of the aspect ratios of particles 121 on the surface of the zeolite membrane 12 is greater than or equal to 1.4 and less than or equal to 4. This further improves the orientations of the particles 121 and further reduces the interstices among the particles 121. As a result, it is possible to further improve the denseness of the zeolite membrane 12. The above average value of the aspect ratios can be obtained by, for example, focusing on a region having a predetermined dimension on the surface of the zeolite membrane 12, obtaining the aspect ratio of each of particles 121 in this area, and obtaining an arithmetical mean of the obtained aspect ratios. Specifically, the average value can be obtained by observing 100 or more particles 121 that are randomly selected from the surface of the zeolite membrane 12 with an SEM, obtaining the aspect ratio of each particle 121, and obtaining an arithmetical mean of these aspect ratios.

Figure 4:
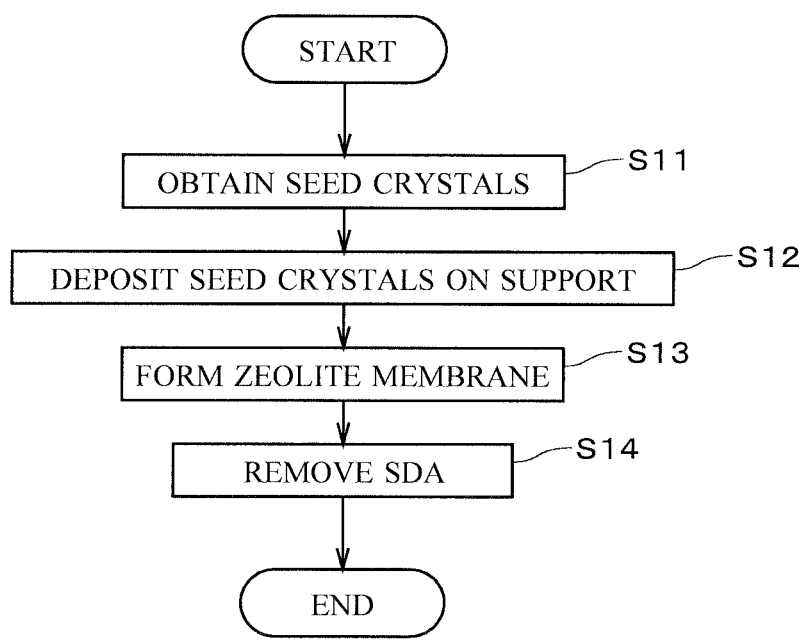
FIG. 4 is a flowchart of production of the zeolite membrane complex.

FIG. 4 is a flowchart of production of the zeolite membrane complex 1. First, SAT-type zeolite powder is synthesized by hydrothermal synthesis, and seed crystals are obtained from this zeolite powder (step S11). In step S11, the zeolite powder may be used as-is as seed crystals, or may be processed by pulverization or other similar methods to obtain seed crystals. Next, the porous support 11 is immersed in a solution in which the seed crystals are dispersed, so that the seed crystals are deposited on the support 11 (step S12). Other methods may be used to deposit the seed crystals on the support 11.

The support 11 with the seed crystals deposited thereon in step S12 is immersed in a starting material solution. Then, an SAT-type zeolite is grown by hydrothermal synthesis using the seed crystals as nuclei to form an SAT-type zeolite membrane on the support 11 (step S13). The temperature of the hydrothermal synthesis is preferably in the range of 130 to 200° C. At this time, an oriented SAT-type zeolite membrane can be obtained by adjusting, for example, the composition ratio of a phosphorus source and a structure-directing agent (hereinafter, also referred to as an "SDA") in the starting material solution.

Thereafter, the SDA in the zeolite membrane is decomposed and removed by heating (step S14). In step S14, the SDA in the zeolite membrane may be removed completely, or may be left in part. In this way, the aforementioned zeolite membrane 12 is synthesized, in which among particles 121 on the membrane surface, particles 121 that have aspect ratios higher than or equal to 1.2 and lower than or equal to 10 account for 85% or more of the area of the membrane surface. As described above, the average value of the aspect ratios of the particles 121 on the surface of the zeolite membrane 12 is greater than or equal to 1.4 and less than or equal to 4.

Specifically, the starting material solution used in step S13 is obtained by mixing an aluminum source and a phosphorus source with a pH greater than or equal to 4 and making an ultimate pH greater than or equal to 5 and less than or equal to 8. In this way, the oriented SAT-type zeolite membrane is obtained. In other words, the pH is greater than or equal to 4 at least at the stage of making the mixed solution of the aluminum source and the phosphorus source. Then, the pH is preferably maintained at 4 or above until the completion of the making of the starting material solution, and ultimately the starting material solution with a pH greater than or equal to 5 and less than or equal to 8 is obtained.

Unlike conventional techniques for making SAT-type zeolite powder, if the pH of the starting material solution is too high when the SAT-type zeolite membrane is grown in step S13 described above, it is difficult to reliably grow the zeolite membrane; and if the pH is too low, it is difficult to suppress the formation of by-product phases other than the SAT-type zeolite. Moreover, if the pH is too low when mixing the aluminum source and the phosphorus source, the starting material solution is likely to become nonuniform, and the growth of the oriented membrane in step S13 described above becomes difficult. In the present embodiment, it is possible to efficiently grow a zeolite membrane by adjusting the mixture ratio of starting materials in the starting material solution so that the aluminum source and the phosphorus source are mixed with a pH greater than or equal to 4 and the starting material solution ultimately has a pH greater than or equal to 5 and less than or equal to 8. Besides, this pH adjustment enables obtaining an oriented SAT-type zeolite membrane. Note that other techniques may be used to adjust the pH of the starting material solution.

For the synthesis of the SAT-type zeolite powder or membrane, examples of the aluminum source that may be used include aluminum alkoxide such as aluminum isopropoxide, aluminum hydroxide, sodium aluminate, and an alumina sol, and examples of the phosphorus source that may be used include phosphoric acids, diphosphorus pentaoxide, sodium dihydrogen phosphate, ammonium dihydrogen phosphate, and phosphoric ester.

Next, the separation of a mixture of substances using the zeolite membrane complex 1 will be described with reference to FIG. 5.

Figure 5:
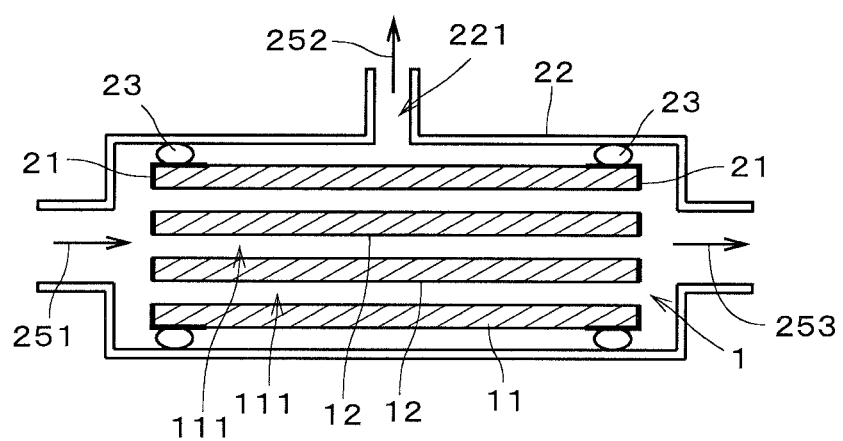
FIG. 5 is an illustration of an apparatus for separating a mixed gas.

In FIG. 5, the zeolite membrane 12 is formed on the inner surfaces of through holes 111 of the support 11. The opposite ends of the support 11 are sealed by sealers 21, and the support 11 is encased in an outer cylinder 22. That is, the zeolite membrane complex 1 is disposed in the outer cylinder 22. The outer cylinder 22 is formed of, for example, stainless steel or carbon steel. The sealers 21 are members that are mounted on the opposite ends of the support 11 of the zeolite membrane complex 1 in the longitudinal direction and cover and seal the opposite end faces of the support 11 in the longitudinal direction. The sealers 21 are, for example, plate-like members formed of glass or a resin. The material and shape of the sealers 21 may be appropriately changed. Moreover, seal members 23 are disposed between the outer cylinder and opposite end portions of the support 11. The seal members 23 are disposed along the entire periphery between the outer side face of the zeolite membrane complex 1 (i.e., the outer side face of the support 11) and the inner side face of the outer cylinder 22 in the vicinity of the opposite end portions of the zeolite membrane complex 1 in the longitudinal direction. The seal members 23 are substantially circular-ring shaped members formed of a material that is impermeable to gases. For example, the seal members 23 are O-rings formed of a resin having flexibility. The seal members 23 are in intimate contact with the outer side face of the zeolite membrane complex 1 and the inner side face of the outer cylinder 22 along the entire periphery. The space between the seal members 23 and the outer side face of the zeolite membrane complex 1 and the space between the seal member 23 and the inner side face of the outer cylinder 22 are sealed so as to almost or completely disable the passage of gases.

In this state, a mixture of substances containing a plurality of types of fluids (i.e., gases or liquids) is introduced into the through holes 111 of the support 11 as indicated by an arrow 251, and substances that have passed through the zeolite membrane 12 are collected from a hole 221 provided in the outer cylinder 22 as indicated by an arrow 252, so that substances with high permeability in the mixture of substances are separated from the other substances. The separation may be performed, for example, for the purpose of extracting substances with high permeability from the mixture of substances or for the purpose of concentrating substances with low permeability.

As described above, the mixture of substances (i.e., mixed fluid) may be a mixed gas containing a plurality of types of gases, or a mixed solution containing a plurality of types of liquids, or a gas-liquid two-phase fluid containing both gases and liquids.

The mixture of substances includes, for example, one or more types of substances including hydrogen ($H_2$), helium (He), nitrogen ($N_2$), oxygen ($O_2$), water ($H_2O$), steam ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acids, alcohol, mercaptans, ester, ether, ketone, and aldehyde.

Nitrogen oxides are compounds of nitrogen and oxygen. Examples of the aforementioned nitrogen oxides include gases called $NO_X$ such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), and dinitrogen pentoxide ($N_2O_5$).

Sulfur oxides are compounds of sulfur and oxygen. Examples of the aforementioned sulfur oxides include gases called $SO_X$ such as sulfur dioxide ($SO_2$) and sulfur trioxide ($SO_3$).

Sulfur fluorides are compounds of fluorine and sulfur. Examples of the aforementioned sulfur fluorides include disulfur difluoride (F—S—S—F, S=$SF_2$), sulfur difluoride ($SF_2$), sulfur tetrafluoride ($SF_4$), sulfur hexafluoride ($SF_6$), and disulfur decafluoride ($S_2F_{10}$).

C1 to C8 hydrocarbons are hydrocarbons containing one to eight carbon atoms. C3 to C8 hydrocarbons may be any of linear-chain compounds, side-chain compounds, and cyclic compounds. C2 to C8 hydrocarbons may also be either saturated hydrocarbons (i.e., the absence of double bonds and triple bonds in molecules) or unsaturated hydrocarbons (i.e., the presence of double bonds and/or triple bonds in molecules). Examples of C1 to C4 hydrocarbons include methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2=CHCH_2CH_3$), 2-butene ($CH_3CH=CHCH_3$), and isobutene ($CH_2=C(CH_3)_2$).

The aforementioned organic acids are, for example, carboxylic acids or sulfonic acids. Examples of the carboxylic acids include formic acids ($CH_2O_2$), acetic acids ($C_2H_4O_2$), oxalic acids ($C_2H_2O_4$), acrylic acids ($C_3H_4O_2$), and benzoic acids ($C_6H_5COOH$). The sulfonic acids are, for example, ethane sulfonic acids ($C_2H_6O_3S$). The organic acids may be either chain compounds or cyclic compounds.

Examples of the aforementioned alcohol include methanol ($CH_3OH$), ethanol ($C_2H_5OH$), isopropanol (2-propanol) ($CH_3CH(OH)CH_3$), ethylene glycol ($CH_2(OH)CH_2(OH)$), and butanol ($C_4H_9OH$).

The mercaptans are organic compounds with hydrogenerated sulfur (SH) at their terminals and are substances that are also called thiol or thioalcohol. Examples of the aforementioned mercaptans include methyl mercaptans ($CH_3SH$), ethyl mercaptans ($C_2H_5SH$), and 1-propane thiols ($C_3H_7SH$).

Examples of the aforementioned ester include formic acid ester and acetic acid ester.

Examples of the aforementioned ether include dimethyl ether (($CH_3)_2O$), methyl ethyl ether ($C_2H_5OCH_3$), and diethyl ether (($C_2H_5)_2O$).

Examples of the aforementioned ketone include acetone (($CH_3)_2CO$), methyl ethyl ketone ($C_2H_5COCH_3$), and diethyl ketone (($C_2H_5)_2CO$).

Examples of the aforementioned aldehyde include acetaldehyde ($CH_3CHO$), propionaldehyde ($C_2H_5CHO$), and butanal (butyraldehyde) ($C_3H_7CHO$).

The following description takes the example of the case where the aforementioned mixture of substances is a mixed gas containing a plurality of types of gases.

As indicated by the arrow 251, the pressure of the mixed gas supplied to the internal space of the outer casing 22 (i.e., initial pressure) is in the range of, for example, 0.1 MPa to 10.0 MPa. The pressure of the mixed gas collected from the hole 221 of the outer cylinder 22 (i.e., permeation pressure) as indicated by the arrow 252 is, for example, atmospheric pressure. The pressure of the mixed gas that does not pass through the zeolite membrane 12 and is exhausted out of the outer cylinder 22 (i.e., non-permeation pressure) is, for example, equivalent to the initial pressure. The temperature of separating the mixed gas is, for example, in the range of 10° C. to 200° C.

As indicated by the arrow 251, the mixed gas supplied to the outer cylinder 22 is introduced from the left side of the zeolite membrane complex 1 in the drawing into each through hole 111 of the support 11. Gases with high permeability (e.g., $CO_2$; hereinafter referred to as "high-permeability substances") in the mixed gas pass through the zeolite membrane 12 provided on the inner side face of each through hole 111 and through the support 11 and are discharged from the outer side face of the support 11. In this way, the high-permeability substances are separated from gases with low permeability (e.g., $CH_4$; hereinafter referred to as "low-permeability substances") in the mixed gas. The gases discharged from the outer side face of the support 11 (i.e., high-permeability substances) are collected from the hole 221 of the outer cylinder 22 as indicated by the arrow 252.

In the mixed gas, gases other than gases that have passed through the zeolite membrane 12 and the support 11 (hereinafter, referred to as "impermeable substances") pass through each through hole 111 of the support 11 from the left side to the right side in the drawing and are exhausted out of the outer cylinder 22 as indicated by an arrow 253. The impermeable substances may include high-permeability substances that have not passed through the zeolite membrane 12, in addition to the aforementioned low-permeability substances.

Next, one example of the production of the zeolite membrane complex will be described.

Preparation of Seed Crystals

A starting material solution with a composition of $1Al_2O_3$:$1P_2O_5$:$0.8SDA$:$200H_2O$ was prepared by dissolving aluminum isopropoxide, 85% phosphoric acid, and 1,4-diazabicyclo [2,2,2]octane-C4-diquat hydroxide respectively as the aluminum source, the phosphorus source, and the structure-directing agent (SDA) in deionized water. This starting material solution was subjected to hydrothermal synthesis at 190° C. for 50 hours. Crystals obtained by the hydrothermal synthesis were collected, rinsed enough in deionized water, and then dried at 100° C. The obtained crystals, as a result of X-ray diffraction measurement, were SAT-type zeolite crystals. These crystals were poured in deionized water so as to have a mass percent of 10 to 20 and pulverized for 7 days with a ball mill into seed crystals.

Preparation of SAT-Type Zeolite Membrane

A porous alumina support having a monolith shape was brought into contact with a solution in which the aforementioned seed crystals were dispersed, in order to deposit the seed crystals inside cells, the cells being the through holes of the support. Thereafter, a starting material solution with a composition of $1Al_2O_3$:$2P_2O_5$:$2.3SDA$:$1000H_2O$ was prepared by dissolving aluminum isopropoxide, 85% phosphoric acid, and 1,4-diazabicyclo [2,2,2]octane-C4-diquat hydroxide respectively as the aluminum source, the phosphorus source, and the SDA in deionized water. The starting material solution for zeolite membrane was prepared such that the aluminum source and the phosphorus source were mixed with a pH greater than or equal to 4 and aluminum was distributed uniformly in the starting material solution. The starting material solution had a pH of 7.

The aforementioned support with the seed crystals applied thereon was immersed in this starting material solution and subjected to hydrothermal synthesis at 170° C. for 50 hours. Accordingly, an SAT-type zeolite membrane was formed on the support. After the hydrothermal synthesis, the support and the zeolite membrane were rinsed enough with deionized water and then dried at 100° C. The $N_2$ permeance of the SAT-type zeolite membrane, measured after the drying, was less than or equal to 0.005 nmol/m² s Pa. This confirmed that the zeolite membrane had an applicable degree of denseness. Thereafter, the zeolite membrane was subjected to heat treatment at 500° C. for 20 hours so as to burn and remove the SDA and cause microspores in the zeolite membrane to come through the membrane.

Gas Separation Test

Next, a mixed-gas separation test was conducted, using an apparatus having a schematic structure illustrated in FIG. 5. In FIG. 5, the zeolite membrane 12 was formed on the inner surfaces of the through holes 111 of the support 11. Each end of the support 11 was sealed by the glass 21, and the support 11 was encased in the outer cylinder 22. In this state, a mixed gas was introduced into the through holes 111 of the support 11 as indicated by the arrow 251, and gases that had passed through the zeolite membrane 12 were collected from the hole 221 of the outer cylinder 22 as indicated by the arrow 252.

The initial pressure of the gas in the separation test was 0.2 MPaG. As the aforementioned mixed gas, a gas with a $CO_2$/$CH_4$ ratio of 50:50 was used. As a result, the $CO_2$/$CH_4$ permeance ratio was 1810. This confirmed that the SAT-type zeolite membrane 12 had sufficiently applicable separation performance. A result of observing the surface of the zeolite membrane 12 with a scanning electron microscope indicated that, among particles 121 on the surface of the zeolite membrane 12, particles 121 that had aspect ratios higher than or equal to 1.2 and lower than or equal to 10 accounted for approximately 90% of the surface area of the zeolite membrane 12.

Also, the SAT-type zeolite membrane 12 was prepared, using a starting material solution having a pH of 5 to 8, the starting material solution being prepared by adjusting the mixture ratio of starting materials so that the aluminum source and the phosphorus source were mixed with a pH greater than or equal to 4. In this case, among particles 121 on the surface of the zeolite membrane 12, particles 121 that had aspect ratios higher than or equal to 1.2 and lower than or equal to 10 accounted for 85% or more of the surface area of the zeolite membrane 12. For these membranes, it was confirmed that separation performance was improved as a result of an improvement in the orientations of the particles 121 and a reduction in the interstices among the particles 121.

In the case where, as a comparative example, a starting material solution was prepared under conditions described in Document 1 above, the pH during the mixing of the aluminum source and the phosphorus source was 3, and the starting material solution had a pH of 7. In an X-ray diffraction pattern of an SAT-type zeolite membrane prepared using this starting material solution, the intensity of a peak at around $2\theta=13.9°$ was 1.1 times the intensity of a peak at around $2\theta=8.5°$. That is, the SAT-type zeolite membrane was not oriented in this case. Besides, in the case where a starting material solution was prepared to have a pH of 10 by changing the mixture ratio of starting materials and an SAT-type zeolite membrane was synthesized, the SAT-type zeolite membrane was not formed on the support. In this way, the zeolite membrane complex according to the present invention is a new zeolite membrane complex including an SAT-type zeolite membrane that is suitably oriented.

Variations

The zeolite membrane complex and the production thereof described above may be modified in various ways.

Instead of aluminum isopropoxide, other materials that belong to aluminum alkoxide or alumina sols may be used as the aluminum source in the starting material solution. Aluminum alkoxide or alumina sols are materials that are newly used in the synthesis of SAT-type zeolites. Aluminum alkoxide or alumina sols may be used only to synthesize seed crystals, or may be used only to synthesize a zeolite membrane.

The SAT-type zeolite membrane does not necessarily have to be purely composed of aluminum phosphate, and may contain other elements. For example, the SAT-type zeolite membrane may contain Mg atoms or Si atoms.

The zeolite membrane complex 1 may further include a functional membrane or a protective membrane that is laminated on the zeolite membrane 12. Such a functional or protective membrane is not limited to a zeolite membrane, and may be an inorganic membrane such as a carbon membrane or a silica membrane, or may be an organic membrane such as a polyimide membrane or a silicone membrane.

The configurations according to the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

The zeolite membrane complex according to the present invention can be used as, for example, a gas separation membrane, and can also be used in various fields using zeolites, for example as a separation membrane for substances other than gases or as an adsorption membrane for various substances.

REFERENCE SIGNS LIST

1 Zeolite membrane complex
11 Support
12 Zeolite membrane
S11 to S14 Step

The invention claimed is:

1. A zeolite membrane complex comprising:
    a support; and
    a zeolite membrane formed on said support;
    wherein said zeolite membrane is of an SAT-type zeolite, and
    among particles on a surface of said zeolite membrane facing away from said support, particles that have aspect ratios higher than or equal to 1.2 and lower than or equal to 10 account for 85% or more of an area of said surface of said zeolite membrane.

2. The zeolite membrane complex according to claim 1, wherein
    an average value of aspect ratios of said particles on said surface of said zeolite membrane is greater than or equal to 1.4 and less than or equal to 4.

3. The zeolite membrane complex according to claim 1, wherein said support is porous.

4. The zeolite membrane complex according to claim 1, wherein
    said support is an alumina sintered compact or a mullite sintered compact.

5. A method of producing a zeolite membrane complex, comprising:
    a) synthesizing an SAT-type zeolite by hydrothermal synthesis and obtaining seed crystals from said SAT-type zeolite;
    b) depositing said seed crystals on a support;
    c) immersing said support in a starting material solution having a pH greater than or equal to 5 and less than or equal to 8, and growing an SAT-type zeolite from said seed crystals by hydrothermal synthesis to form a zeolite membrane on said support, the starting material solution being prepared by mixing an aluminum source and a phosphorus source with a PH greater than or equal to 4; and
    d) removing a structure-directing agent from said zeolite membrane,
    wherein, among particles on a surface of said zeolite membrane facing away from said support, particles that have aspect ratios higher than or equal to 1.2 and lower than or equal to 10 account for 85% or more of an area of said surface of said zeolite membrane.

6. The method of producing a zeolite membrane complex according to claim 5, wherein
    an average value of aspect ratios of said particles on said surface of said zeolite membrane is greater than or equal to 1.4 and less than or equal to 4.

7. The method of producing a zeolite membrane complex according to claim 5, wherein
    in said operation a) or c), aluminum alkoxide or an alumina sol is used as the aluminum source in the hydrothermal synthesis.

* * * * *